United States Patent [19]

Brown et al.

[11] Patent Number: 4,972,318

[45] Date of Patent: Nov. 20, 1990

[54] ORDER ENTRY AND INVENTORY CONTROL METHOD

[75] Inventors: Gordon T. Brown; Richard H. Scherer, both of Pittsburgh, Pa.

[73] Assignee: Iron City Sash & Door Company, Pittsburgh, Pa.

[21] Appl. No.: 513,840

[22] Filed: Apr. 24, 1990

Related U.S. Application Data

[63] Continuation-in-part of Ser. No. 243,090, Sep. 9, 1988.

[51] Int. Cl.⁵ ............................................. G06F 15/21
[52] U.S. Cl. ................................... 364/403; 364/401
[58] Field of Search ... 364/401, 403, 406, 200 MS File, 364/900 MS File

[56] References Cited

U.S. PATENT DOCUMENTS 4,654,482  3/1987  DeAngelis ............................ 379/95
4,734,858  3/1988  Schlafly .............................. 364/408

FOREIGN PATENT DOCUMENTS 2105075  3/1983  United Kingdom .

OTHER PUBLICATIONS

"Comp-U-Store System Could Change Retail Economics", *Direct Marketing*, Jul. 1983, pp. 101-107.
Gatty, "Setting Up Shop on Computer Screens", *Nation's Business*, Mar. 1984, pp. 57-58.
Riggs, "Direct Marketing Goes Electronic", *S & MM*, Jan. 1985, pp. 59-60.
*Videodisk and Optical Disk*, vol. 5, No. 4, Jul.-Aug. 1985, pp. 244-247.
*Videodisk and Optical Disk*, vol. 5, No. 5, Sep.-Oct. 1985, pp. 343-345.
*Advertising Age*, vol. 56, No. 90, Nov. 1985, p. 66.

*Primary Examiner*—Jerry Smith
*Assistant Examiner*—David Huntley
*Attorney, Agent, or Firm*—Walter J. Blenko, Jr.; David V. Radack

[57] ABSTRACT

A method of order entry, product selection and inventory control for building products, building product accessories and building product components sold by a dealer to a customer. The method comprises the steps of providing a computer having a display screen and a plurality of files. A first file lists descriptions, dimensions and styles of available building products by product code along with building product accessories. A second file lists rough opening dimensions and building products fitting the rough opening dimensions and a third file lists building product components. A customer can enter into the computer a product code, a rough opening dimension or plural product codes for a desired building product. Based on the entry, the computer will select a building product. The computer then determines and displays the desired building product along with a price. The customer can then order the desired building product from an inventory.

10 Claims, 17 Drawing Sheets

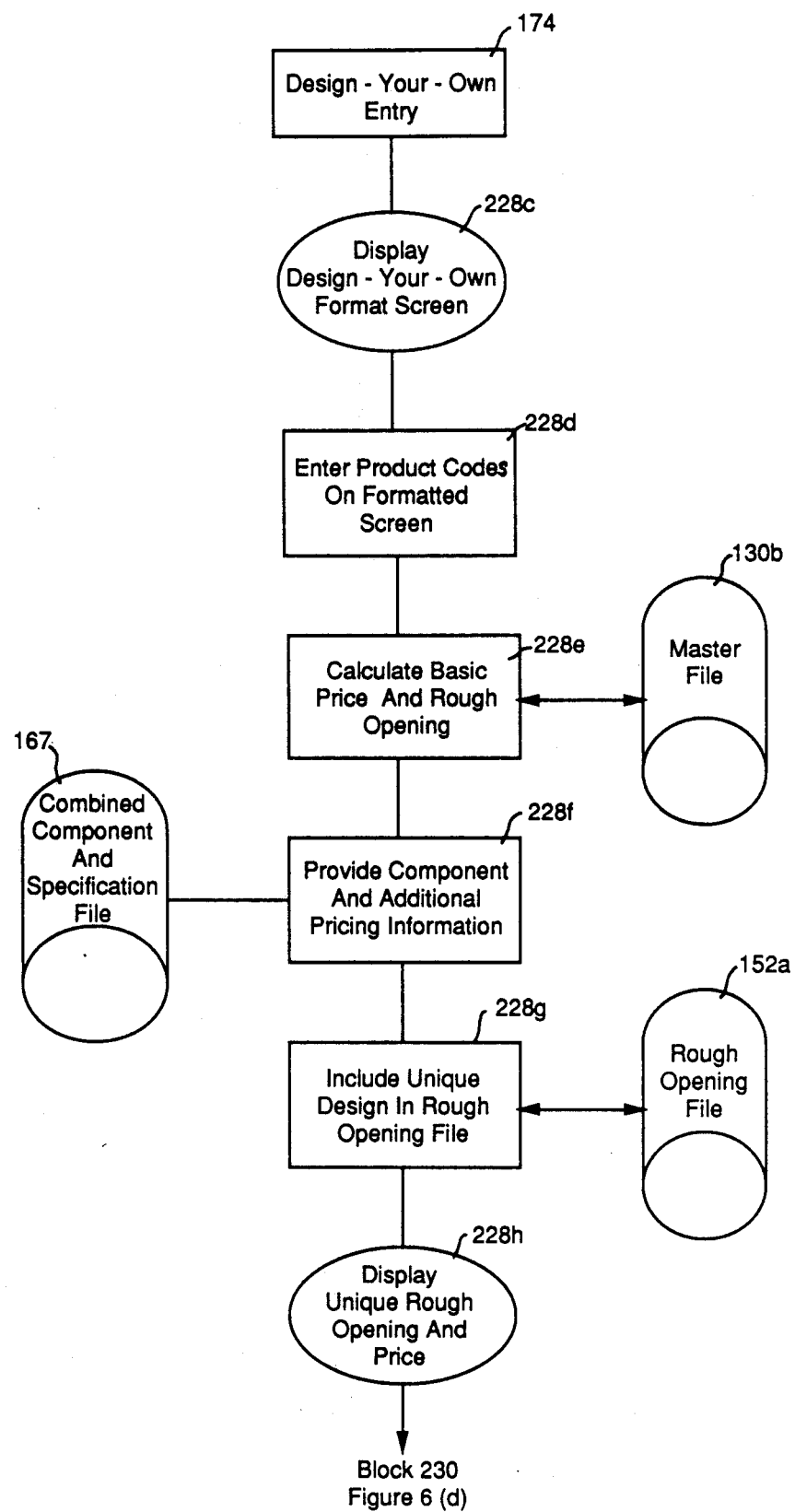
FIG. 6 (c) (1)

ORDER ENTRY AND INVENTORY CONTROL METHOD

This application is a continuation-in-part of our co-pending application Ser. No. 07/243,090 which was filed on Sept. 9, 1988.

This invention relates to an order entry and inventory control method and more specifically, to a method whereby customers of a dealer or the dealer can enter into a computer a product code, a "rough opening" entry or a plurality of product codes. Based on the entry, the computer will select a building product along with all building product accessories (such as grills, screens and hardware) and building product components (such as mull posts), if necessary. The computer determines and displays the price for the desired building product and accessories and components and the customer can order the same from the dealer, a distributor of the goods, the supplier of the goods or a combination of two or three of these sources.

Electronic data ordering ("EDO") is increasingly being used by suppliers of products to industry. Typically, EDO's consist of a computer terminal that a customer can access that is tied into a computer owned by the dealer of the product. The customer enters into the computer an order for a certain product, and this order is sent, via data transmission lines, to the dealer's computer. The dealer's computer matches the customer order with inventory availability, pricing data, and other information. The customer's order is then shipped from the dealer's inventory.

A further enhancement of EDO is electronic data interchange ("EDI"). EDI's involve a series of dealers and suppliers who have computer terminals that are networked into one central computer. This central computer then communicates information such as purchase orders and invoices back and forth between the parties.

EDI's have been used by manufacturers to obtain parts from their suppliers. See "Big Businesses Battle To Control EDI Channels", *Network World*, Volume 5, Number 13, Mar. 28, 1988. Manufacturers can dictate the way information is input into the supplier's computer. Thus, specific part numbers and/or inventory numbers can be entered into the EDI computer. This is also true for systems where customers order inventory directly from a supplier. See "Marketing By Modem", *Industry Week*, June 6, 1988.

A problem arises when specific part numbers and inventory numbers are not known. This is especially a problem when dealing with specialty items or high priced items such as building products sold to a customer or contractor. Typically, these customers have a rough idea of what style and size is needed, but are unaware of the manufacturers and, especially the manufacturers' inventory part numbers.

We provide a method of order entry, product selection and inventory control for building products, building product accessories and building product components sold by a dealer to a customer. Our method comprises the steps of providing a computer having a display screen and a plurality of files. We provide a first file listing descriptions, dimensions and styles of available building products by product code along with building product accessories, a second file listing rough opening dimensions and building products fitting the rough opening dimensions and a third file listing building product components. We further provide means to enable a customer to enter into the computer a product code, a rough opening dimension or plural product codes for a desired building product. The computer takes this information and displays the desired building product along with a price. We then provide means to enable the customer to order the desired building product from an inventory. We may provide that this inventory can be the dealer's inventory, a distributor's inventory, a supplier's inventory, or a combination of two or three of those inventories.

Other details, objects, and advantages of our invention will become more apparent as the following description of a present preferred embodiment thereof proceeds.

In the accompanying drawings, we illustrate a present preferred embodiment of our invention in which.

Figure 6:
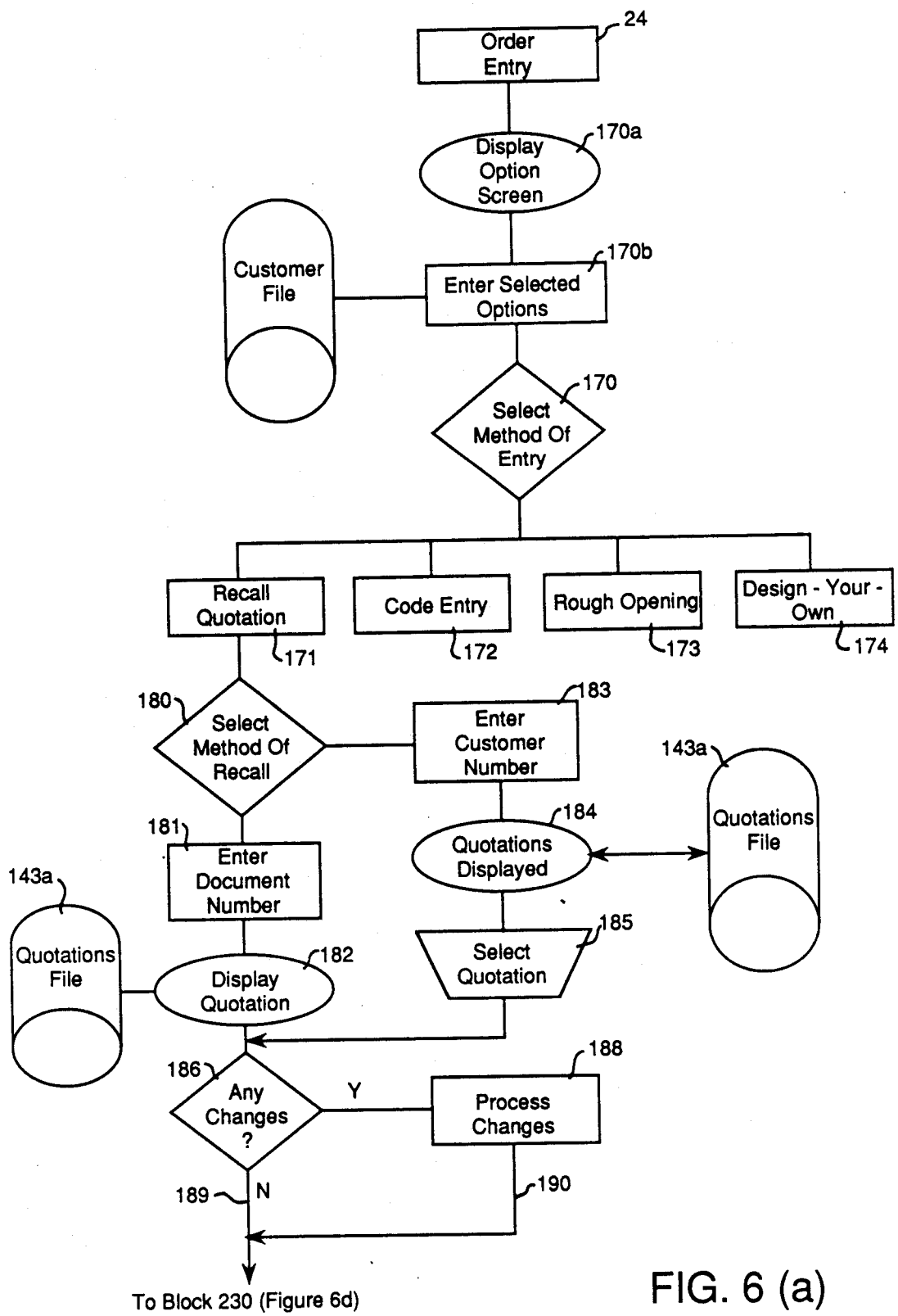
FIG. 6(a) is a flow chart illustrating a part of the order entry routine of the system.
FIG. 6(b) is a flow chart illustrating another part of the order entry routine of the system.
FIG. 6(c) is a flow chart illustrating another part of the order entry routine of the system.
Figure 6:
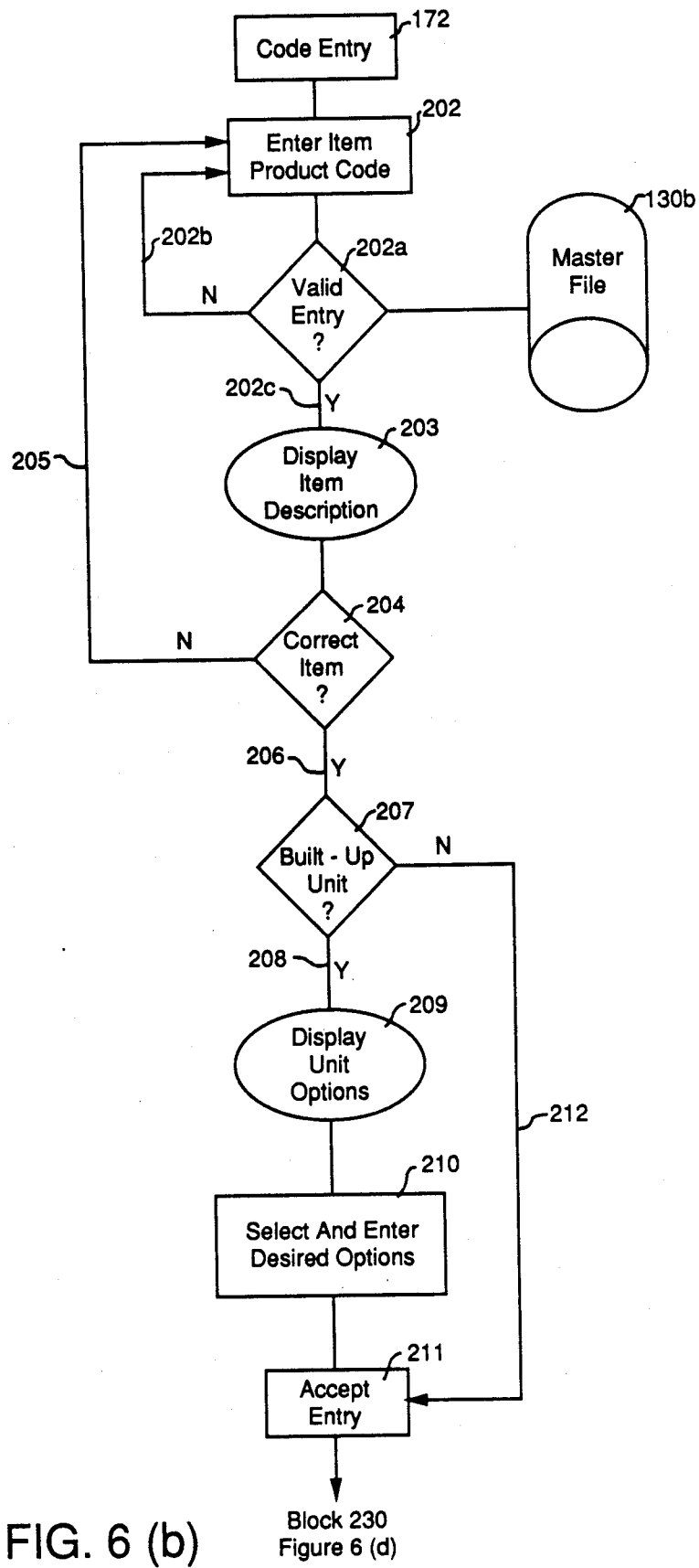
Figure 6:
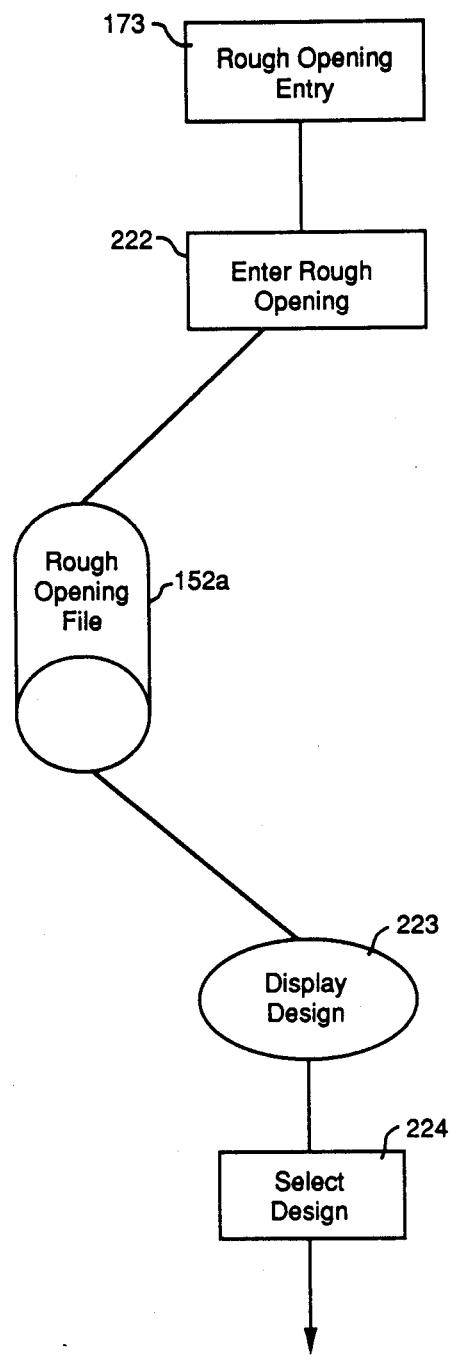
Figure 6:
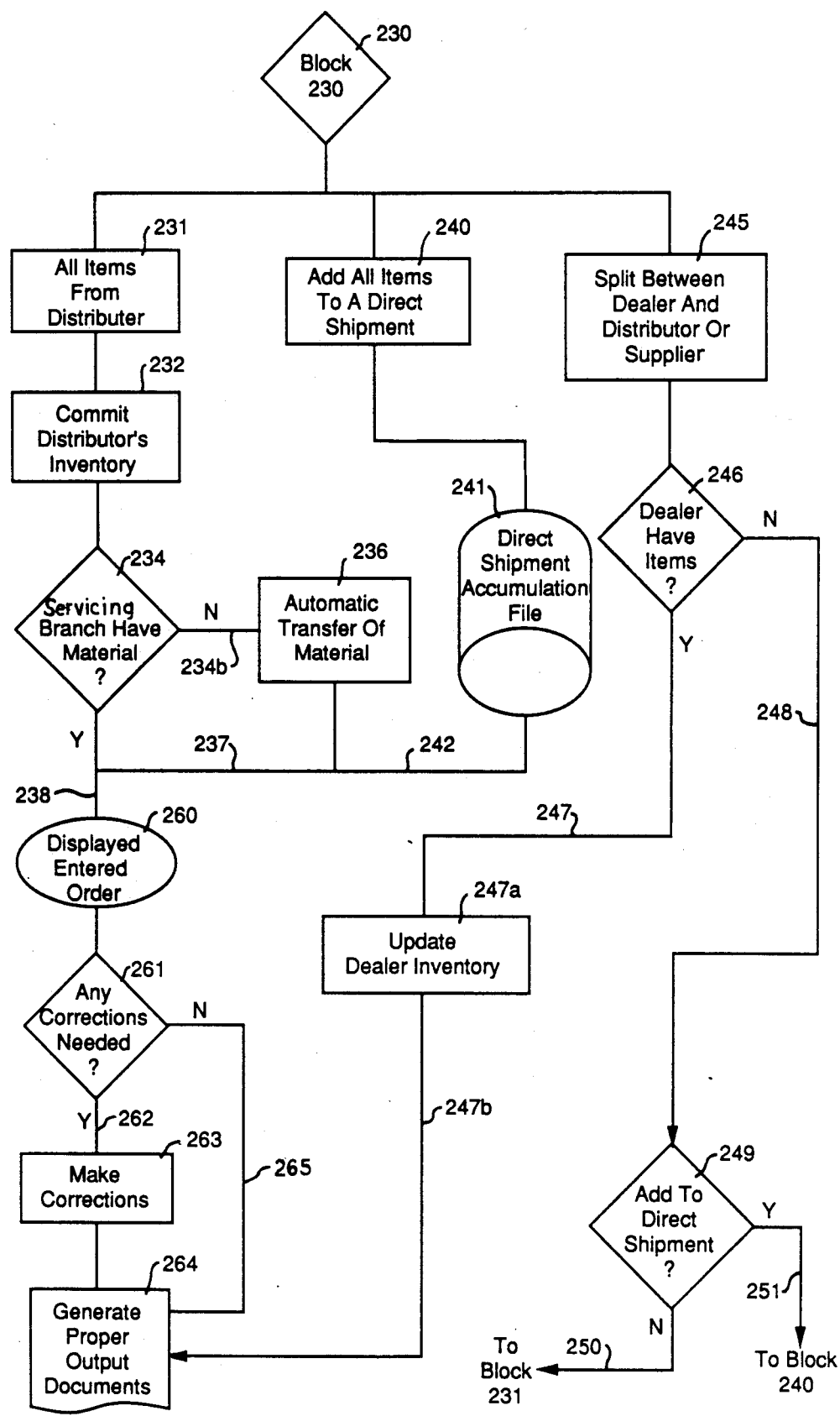

FIG. 6(c)(1) is a flow chart illustrating another part of the order entry routine of the system.

FIG. 6(d) is a flow chart illustrating another part of the order entry routine of the system.

Figure 7:
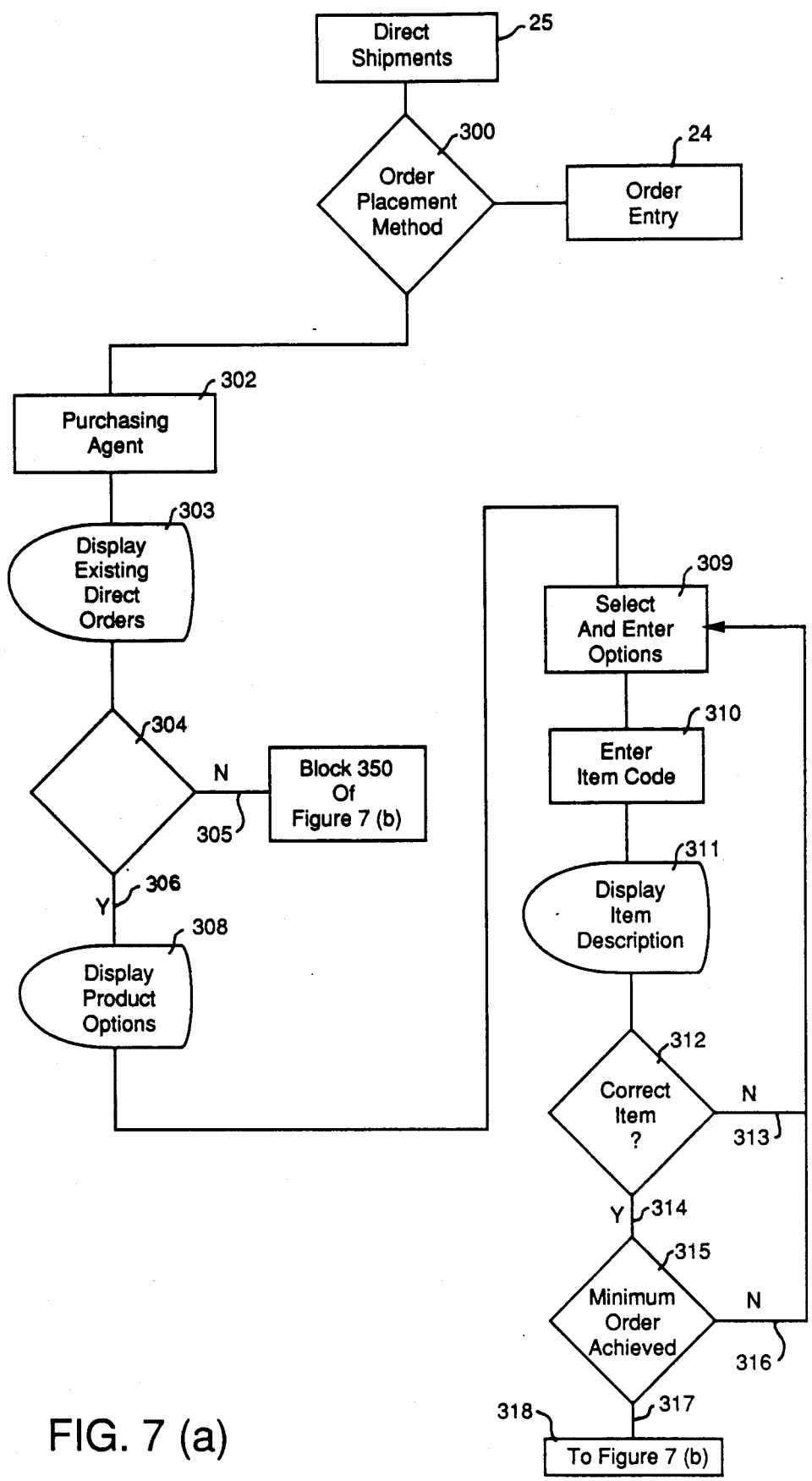
Figure 7:
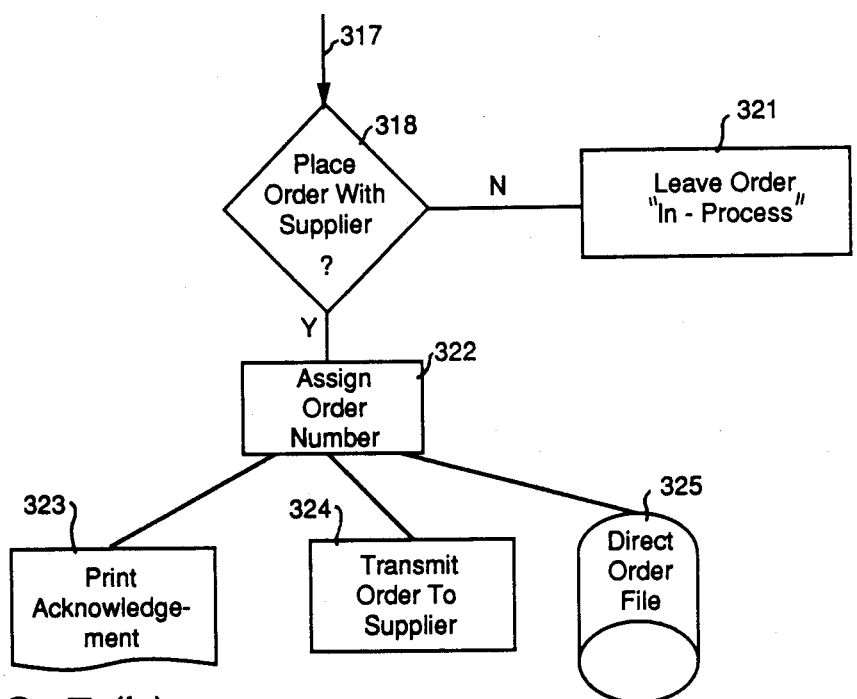
Figure 7:
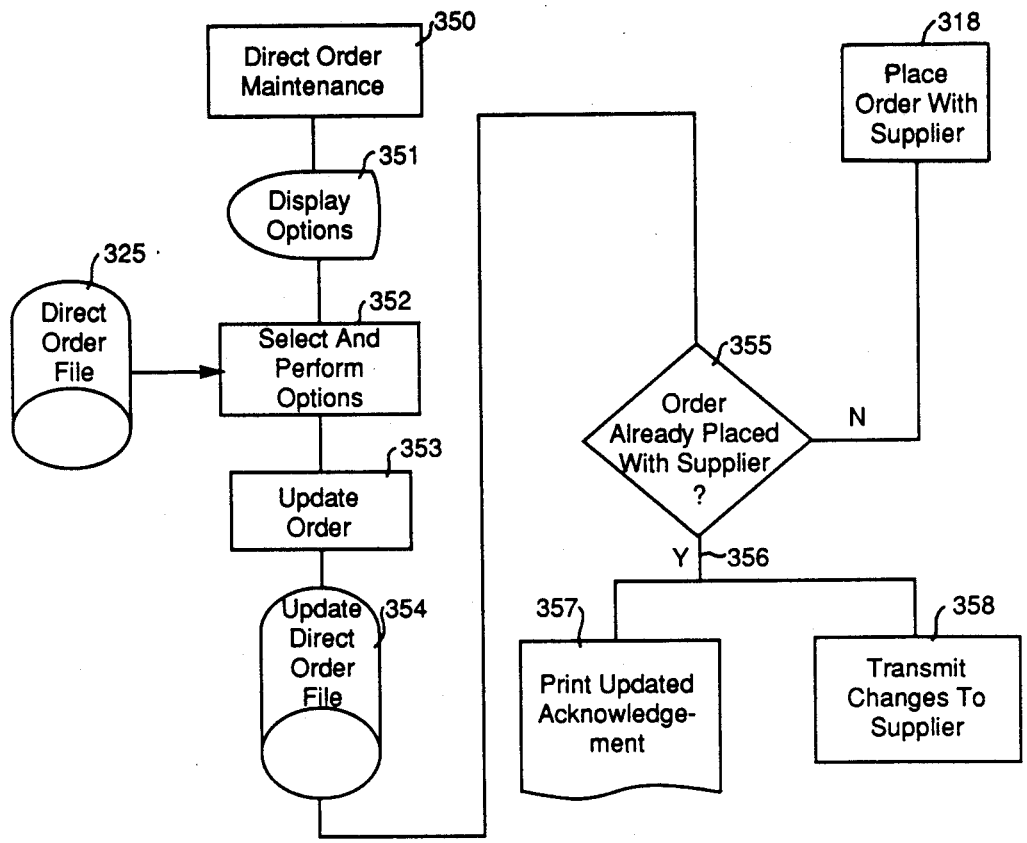

FIG. 7(a) is a flow chart illustrating a part of the direct shipment routine of the system.

FIG. 7(b) is a flow chart illustrating another part of the direct shipment routine of the system.

FIG. 7(c) is a flow chart illustrating another part of the direct shipment routine of the system.

Figure 8:
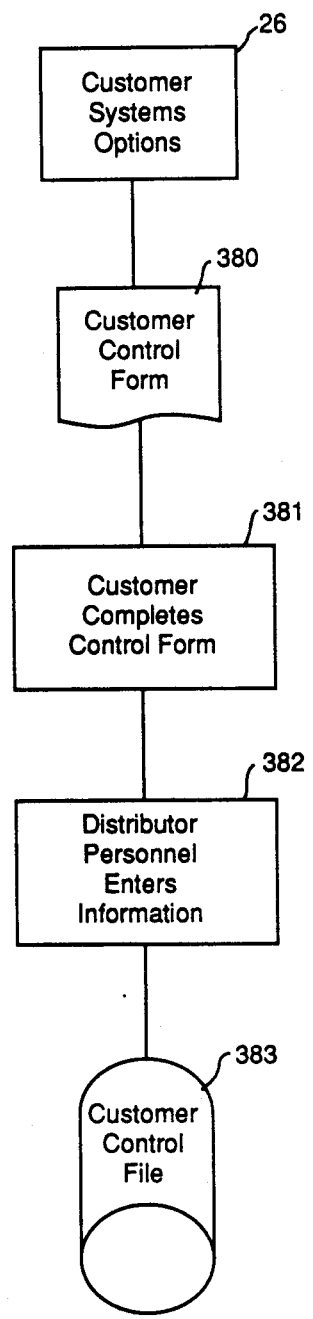

FIG. 8 is a flow chart illustrating the customer systems option routine of the system.

Figure 9:
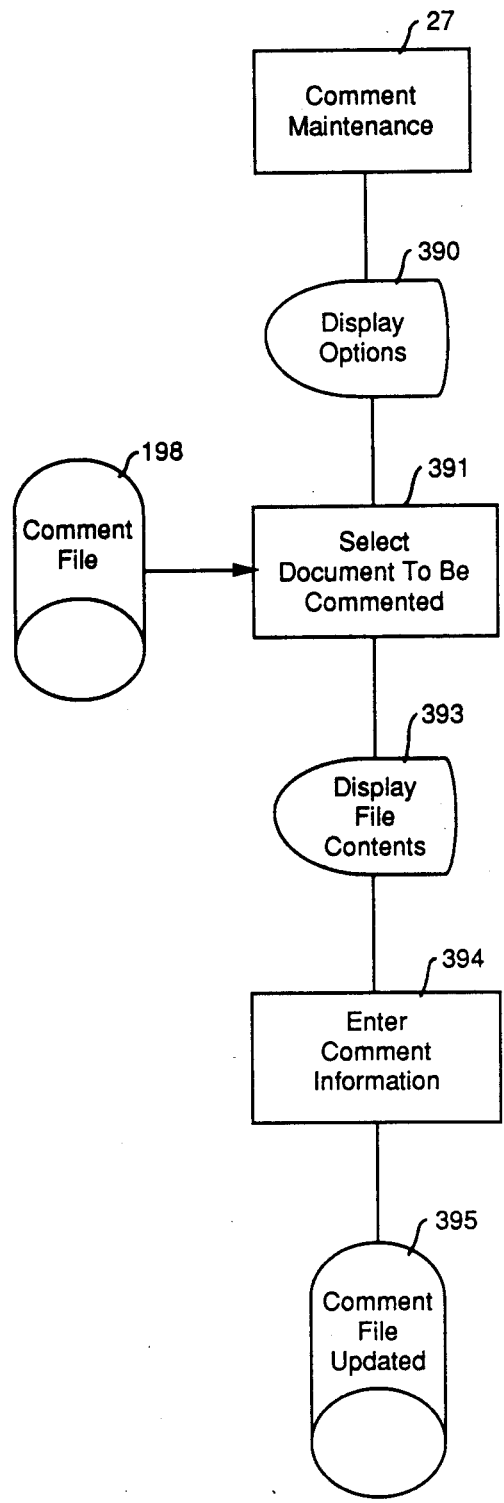

FIG. 9 is a flow chart illustrating the comment file routine of the system.

Figure 10:
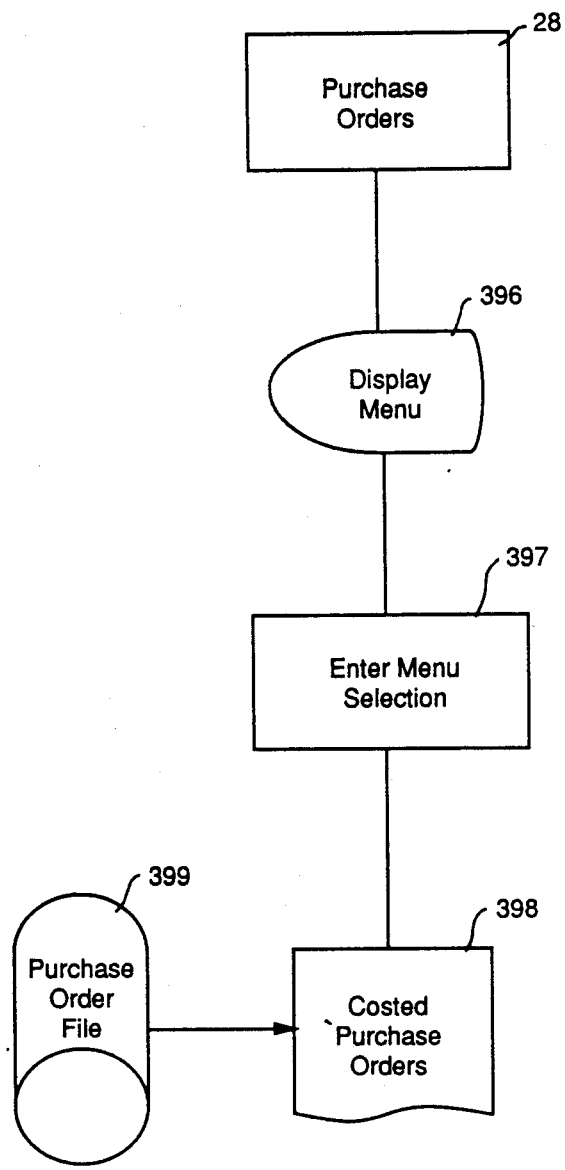

FIG. 10 is a flow chart illustrating the purchase orders routine of the system.

Figure 1:
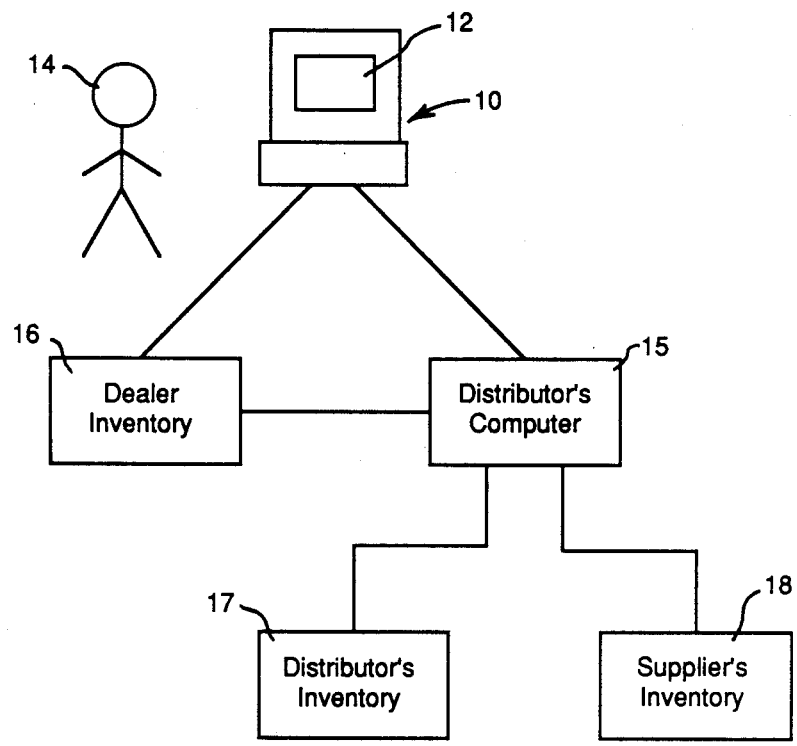
FIG. 1 is a partially schematic diagram of the order entry and inventory control system of the invention.

Referring now to FIG. 1, the order entry and inventory control system preferably consists of a computer terminal 10 with a display screen 12 located at a building product dealer's showroom which can be accessed by the dealer's personnel or the dealer's customers 14. The computer 10 is preferably any IBM compatible personal computer.

The method of order entry and inventory control for building products sold by a dealer to a customer comprises generally the steps of providing a computer 10 having a display screen 12, which can access the distributor's computer 15. It will be appreciated that a number of dealer's computers at the same and different dealers can access the distributor's computer 15. The distributor's computer 15 maintains a plurality of files. The customer enters either a product code, a rough opening dimension or plural product codes into computer 10. The computer 10 transmits this to the distributor's computer 15 which determines the customer desired building product and displays this for the customer 14 on the display screen 12 of the dealer's computer 10. The customer desired building product can then be ordered from the dealer's 16, a distributor's 17 or a supplier's inventory 18 through the distributor.

Figure 2:
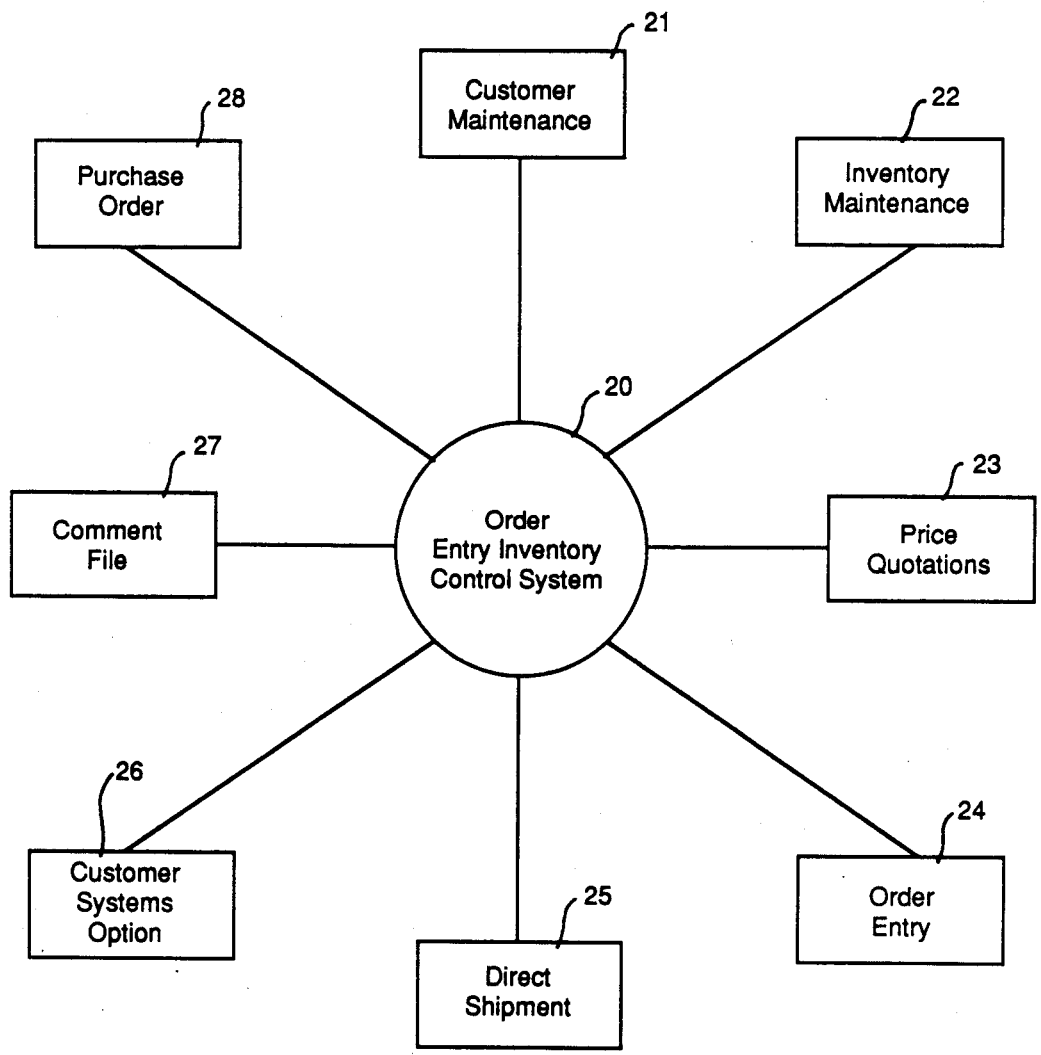
FIG. 2 is a flow chart illustrating the software of the system showing the major routines of the same.

The order entry, product selection and inventory control system software 20 is shown in FIG. 2. The software 20 is on the distributor's computer 15 which can be accessed by the dealer's computer 10. It consists of eight routines; customer maintenance routine 21; inventory maintenance routine 22; price quotation routine 23; order entry routine 24; direct shipment routine 25; customer systems option routine 26; comment file routine 27; and the purchase orders routine 28.

Figure 3:
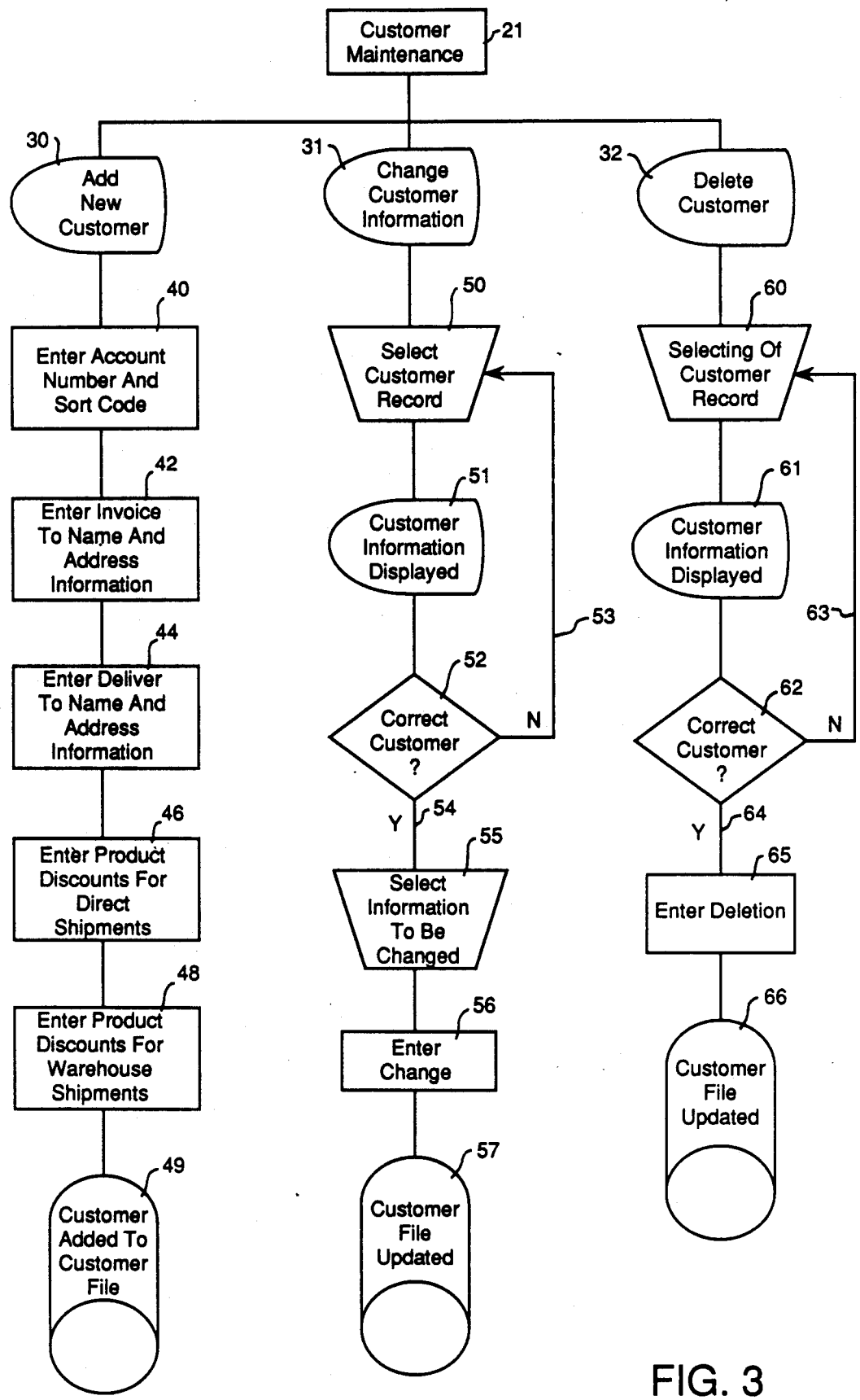
FIG. 3 is a flow chart illustrating the customer maintenance routine of the system.

Referring now to FIG. 3, the customer maintenance routine 21 will be discussed. This routine consists of three subroutines (i) add new customers 30, (ii) change customer information 31, and (iii) delete customers 32. The add new customer 30 subroutine consists of entering a new account number and sort code 40. These account numbers and sort codes can conform to the dealer's current account number listings or may be a unique numbering system. After this, invoice-to name and address data 42 and deliver-to name and address information 44 are entered. Finally, product discounts for that particular customer for direct shipments (explained hereinbelow) 46 and warehouse shipments 48 are entered. All of the data entered is then added to the customer file 49 in the final step of the add new customer subroutine 30.

The change customer information subroutine 31 allows the dealer to change any of the information about the customer in the file. This routine first consists of selecting of the customer's record 50 by one of two methods. The first method is by entering an account number. This customer record would then be displayed 51. The second method is by entering the first alphabetical or numeric character or characters of the sort code in which case each account number containing the character(s) would be displayed 51. If the correct customer is displayed 51 the subroutine 31 moves from decision point 52 by line 54. If not, the subroutine will return from decision point 52 to selecting of another customer record 50 by line 53.

Once the correct customer record is displayed, the information to be changed is selected 55. This change is entered 56 and the data entered is then added to the customer file 57 in the final step of the change customer information subroutine 31.

The delete customer subroutine 32 consists of the similar selecting of customer record 60, displaying customer record 61, and determining if the correct customer record 62 as was found in the change customer information 31 subroutine is found. If the correct customer record is not found, line 63 will lead back to selecting of customer record 60. If the correct customer record is found, line 64 will lead to the enter deletion 65 step where the dealer will delete the customer from the file 66 in the final step of the delete customer subroutine 32.

Figure 4:
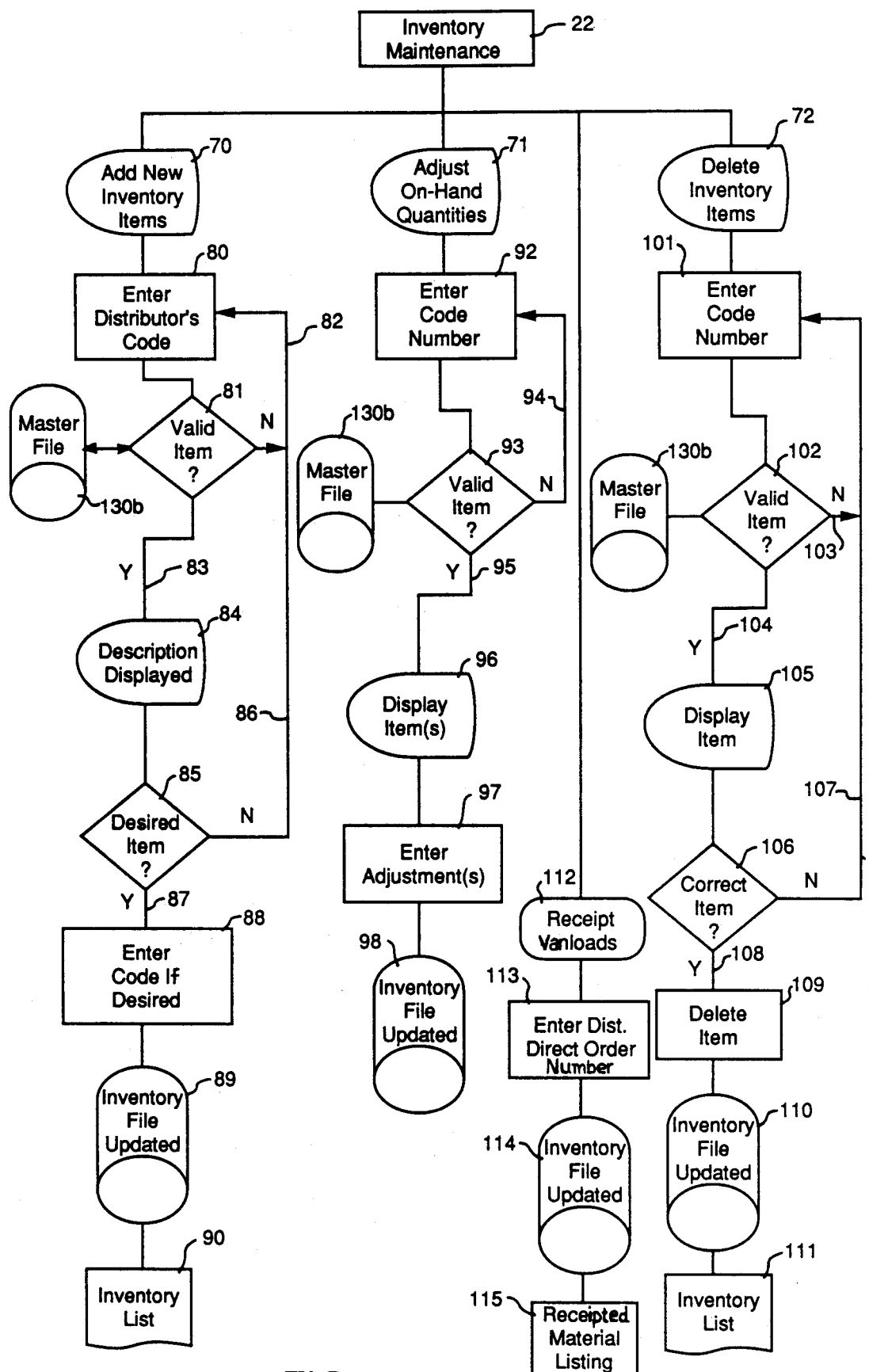
FIG. 4 is a flow chart illustrating the inventory maintenance routine of the system.

Referring to FIG. 4, the inventory maintenance routine 22 flow chart is illustrated. This routine 22 has four separate subroutines; an add new inventory items subroutine 70; an adjust on-hand quantities subroutine 71; a delete inventory items subroutine 72; and a receipt vanloads subroutine 112. This routine 22 allows the dealers to maintain their own inventory of items purchased from manufacturers and distributors.

The add new inventory items subroutine 70, the adjust on-hand quantities subroutine 71 and the delete inventory items subroutine 72 can be maintained by the dealer separately, so that the distributor's software 20 and the distributor's computer 15 need not have these subroutines. The receipt vanloads subroutine 112, however, is preferably maintained on the distributor's computer 15.

The add new inventory items subroutine 70 starts by a user entering a distributor's or manufacturer's product code 80. For example, if an Andersen ® brand double sash window is entered, the product code can be 1602046. Next, the subroutine checks if this is a valid code 81. This is done by comparing the entered code to the manufacturer's coded product file in the building product master file 130b (discussed further hereinbelow), which is maintained on the distributor's computer by the distributor. If this is not a valid item, the subroutine 70 returns by line 82 to the enter distributor code 80 step for reentry of another distributor code. If valid, line 83 leads to a description displayed 84 block which displays the valid distributor code 84. Once the valid item is displayed, it must be determined whether this is the desired item 85. If it is not the desired item, the subroutine will return to step 80 by line 86. If the desired item is found, line 87 will lead to the enter dealer inventory code step 88 if desired, which will in turn update the inventory file 89. When all new items are entered, an updated inventory list is printed 90.

The adjust on-hand quantities subroutine 71 first consists of entering the code number 92 of an item. This code number is verified in block 93 by accessing the master file 130b. If this is not a valid item, the subroutine 71 returns to step 92 by line 94. If this is a valid item, line 95 leads to the display items 96 step which displays the item on the computer screen. At this point, the adjustments are entered 97 by adding to, subtracting from, or changing the quantities of inventory. After this the inventory file 98 is updated in the final step of the adjust on-hand quantities subroutine 71.

The delete inventory items subroutine 72 is similar to the add new inventory items subroutine 70. The delete inventory items subroutine 72 starts by entry of a distributor's or manufacturer's product code 101. Next, the subroutine checks if this is a valid code 102 by accessing the master file 130b. If this is not a valid item, the subroutine 72 returns by line 103 to the enter the product code 101 step for reentry of another product code. If valid, line 104 leads to a description displayed 105 block which displays the valid product code 105. Once the valid item is displayed, it must be determined whether this is the desired item 106. If it is not the desired item, the subroutine will return to step 101 by line 107. If the desired item is found, line 108 will lead to the delete item step 109 which will in turn update the inventory file 110. When new items are entered, or items deleted, an updated inventory list is printed 111.

The receipt vanloads subroutine 112 allows the dealer to receive vanload direct shipments from the distributor's supplier. This subroutine 112 consists of entering the distributor's direct order number 113 which appears on the acknowledgement that was printed when the order was placed. After this, the inventory file is updated 114 and a listing of the ordered material is printed 115 for sight verification with the distributor's invoice when the ordered material is received.

Figure 5:
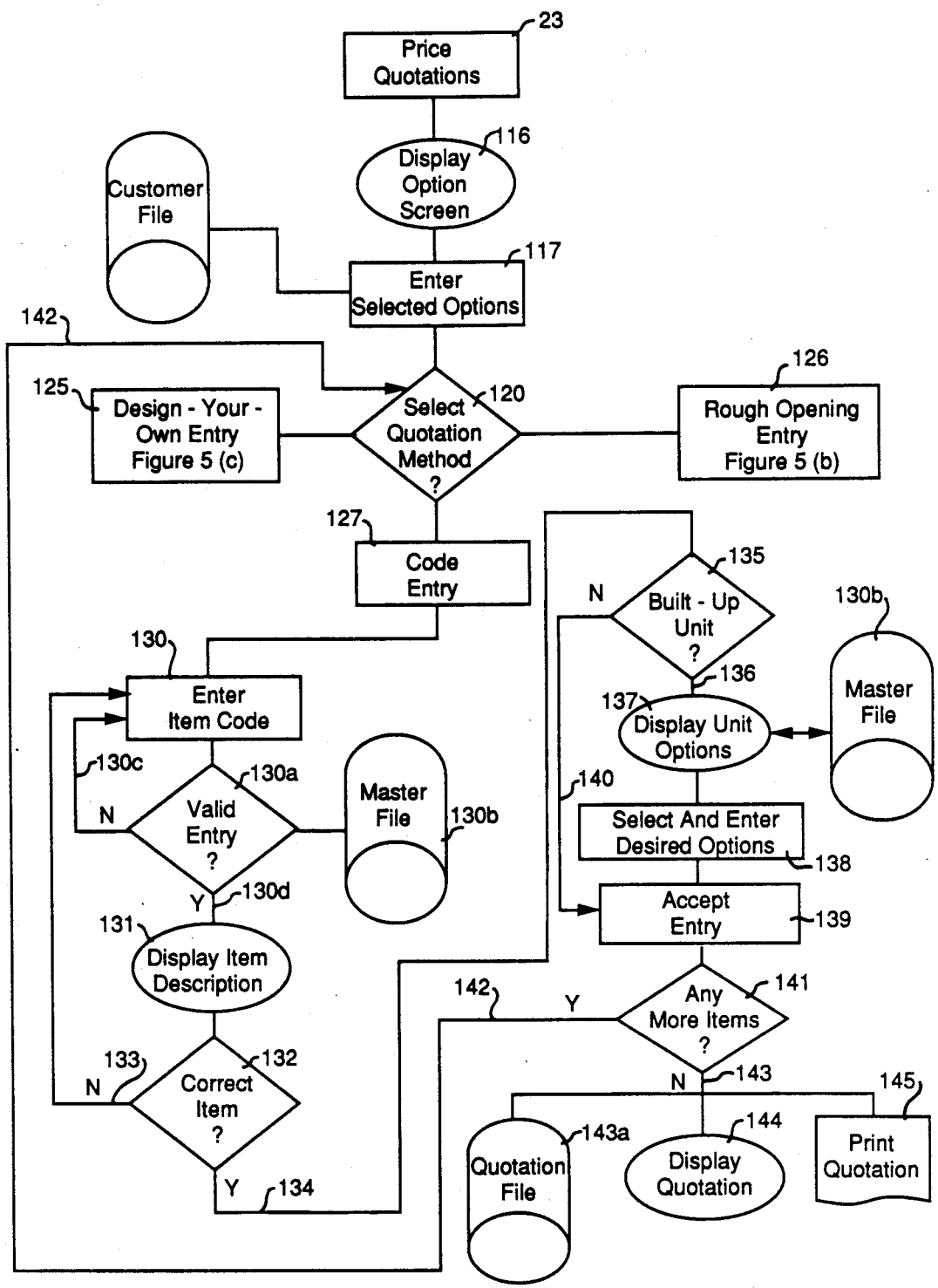
FIG. 5(a) is a flow chart illustrating part of the price quotation routine of the system.
FIG. 5(b) is a flow chart illustrating another part of the price quotation routine of the system.
FIG. 5(c) is a flow chart illustrating another part of the price quotation routine of the system.
FIG. 5(d) is a representation of the format screen for the design-your-own subroutine.
Figure 5:
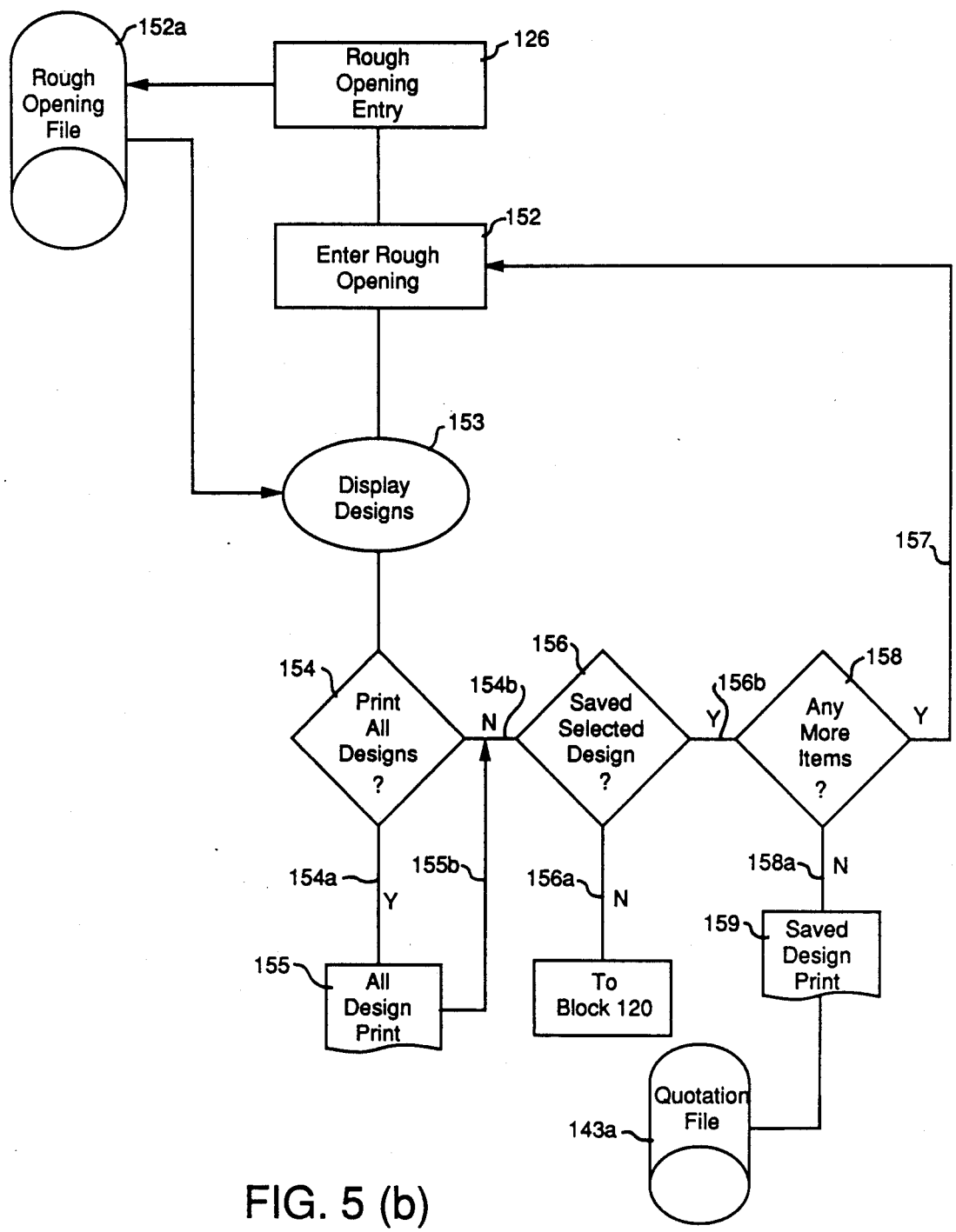
Figure 5:
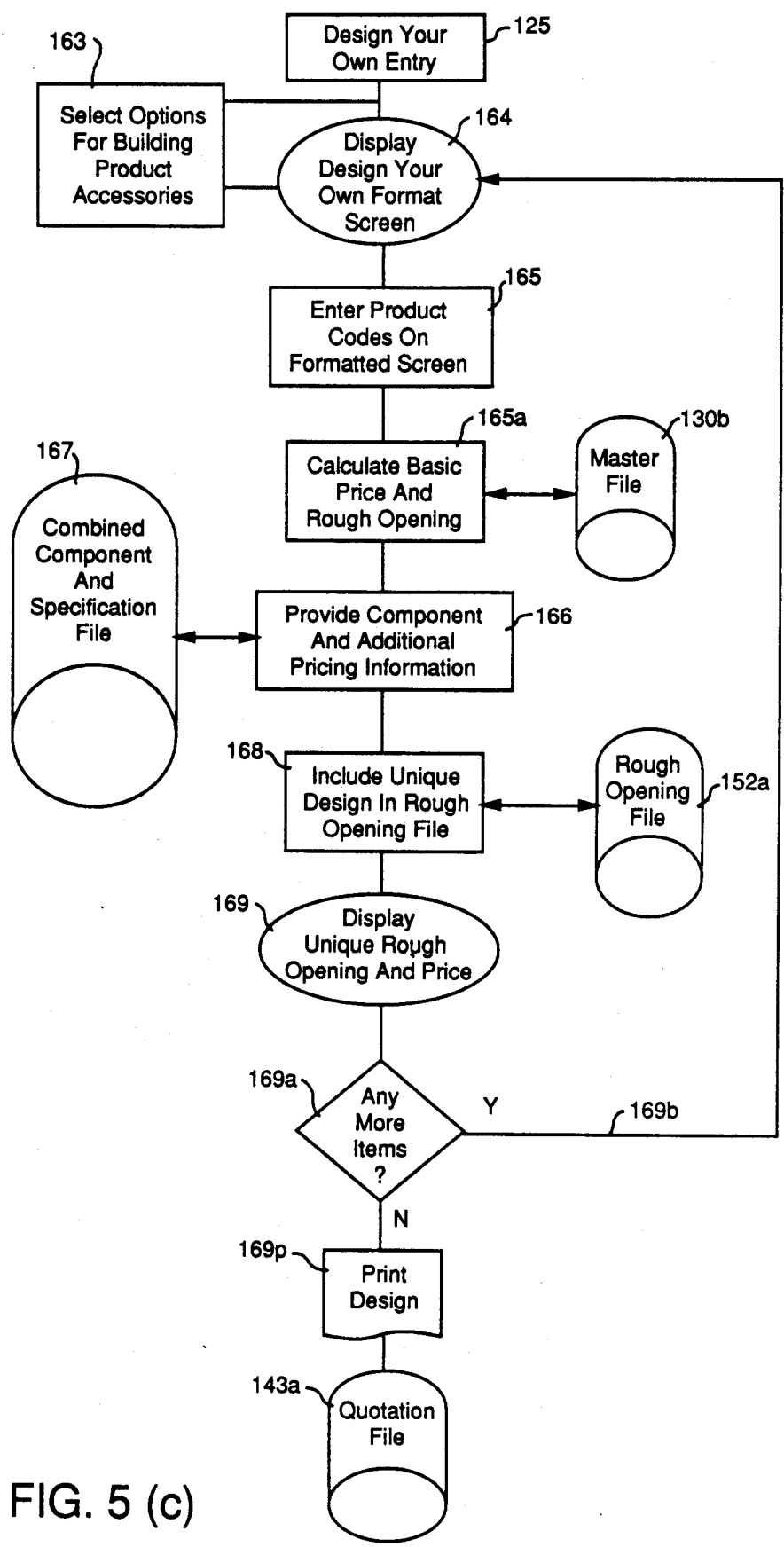
Figure 5:
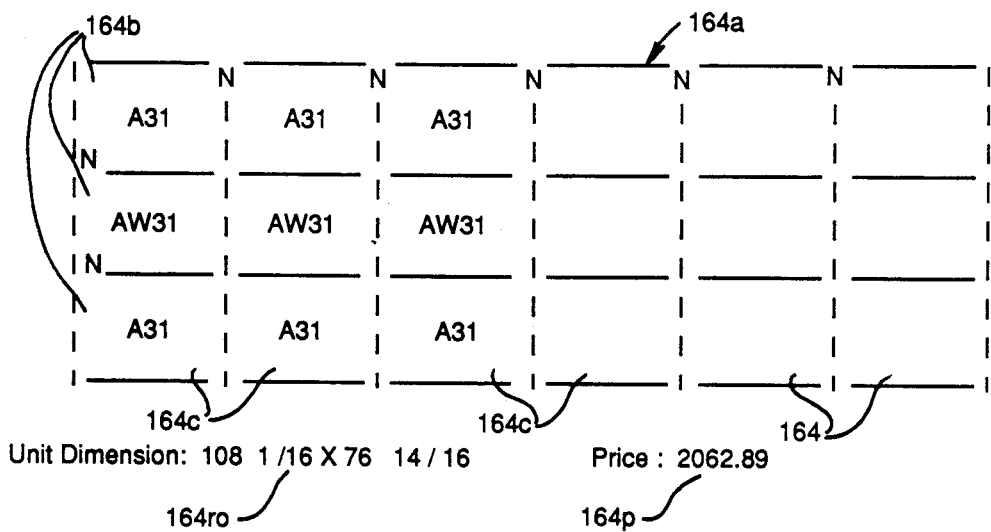

Referring to FIGS. 5(a), 5(b) and 5(c), the price quotation routine 23 of the system will be discussed. The first step is to display an option screen 116 which requires selection of the customer and pricing method. If the customer has an account number, the customer file discussed in connection with FIG. 3 can supply customer specific price discounting information at the enter selected options 117 step. If there is no customer file, the dealer can enter his own customer specific information.

The next step of the price quotations routine is to select the quotation method 120. This can either be by entering (i) manufacturer's product code number 127, (ii) rough entry size opening 126 or (iii) a plurality of manufacturer's product code numbers 125 to create a "design-your-own" entry. The product code entry subroutine 127 will be discussed with reference to FIG. 5(a); the rough entry size opening subroutine 126 will be discussed with reference to FIG. 5(b); and the "design-your-own" subroutine 125 will be discussed with reference to FIG. 5(c).

The code entry subroutine 127 consists first of entering the customer's desired manufacturer's product code 130. The entered product code is first checked to see if it is a valid entry at step 130a. This is done by accessing the building product master file 130b which lists the valid building product codes. The listing includes the description, dimension and style of the particular building product associated with that code, as well as the building product accessories (such as grills and screens) that are available for that building product. If the product code is invalid, line 130c will lead back to the enter item code step 130. If the product code is valid, line 130d will lead to the display item description step 131. The item is displayed for sight verification by the customer. If the item is a valid product code, but not what the customer desired, line 133 will lead the customer back to the enter item code step 130. If the item is correct the computer determines whether the entered item is a built-up item or not by line 134 leading to a decision point 135. A built-up item is a building product which requires more than one part from the same or different manufacturers. For example, a door is a built-up item because most likely door knobs will have different part numbers (and possibly different manufacturers) from the door window glass. If the item is a built-up item, line 136 leads to a display unit options 137 step which shows all of the options, e.g., different accessories, for the basic building product. These options are provided in the master file 130b. The customer's desired options are selected and these are entered 138. The entry is then accepted by the computer 139. If the building product desired by the customer is not a built-up unit, line 140 leads directly to acceptance by the computer of the entry 139.

Next, the subroutine 127 asks if there are any more items 141 to be quoted. If so, line 142 returns the subroutine to the select quotation method step 120 for repetition of the whole process of selecting an item. If not, line 143 leads to a quotation file 143a in which the quotation is stored. The quotation can also be displayed at 144 and, if desired, a hard-copy printout of the quotation 145 can be made.

Referring to FIG. 5(b), the rough opening entry subroutine 126 first starts by asking the customer to enter a "rough opening" at 152. By "rough opening" it is meant the width and height of the opening that the particular building product, i.e., window, door or skylight, will fill. The entered rough opening dimension is compared against the rough opening dimensions listed in a rough opening file 152a. The record in this file 152a consists of a rough opening dimension (such as 32"×44") and a series of "stick drawings" of the building products along with other information such as dimension and price of the building product related to each rough opening dimension.

The record for each appropriate rough opening dimension in the rough opening file 152a is displayed at 153. The customer then has the option of printing all designs found related to his entered rough opening dimension 154. If all designs are to be printed line 154a leads to an all design print step 155. After step 155, line 155b leads to line 154b. If all designs are not to be printed, line 154b leads to a save selected design step 156. The customer chooses the design he desires from the listed designs. If the customer does not want to save a selected design, line 156a will lead to the select quotation method 120 (FIG. 5(a)). If the customer wants to save the selected design, line 156b leads to any more items step 158. If the customer desires to quote any more rough opening dimensions line 157 leads to the enter rough opening step 152. If not, line 158a leads to the saved design print 159 step which prints out the selected and saved design. This saved design is then stored in the quotation file 143a.

The design-your-own subroutine 125 will be discussed with reference to FIGS. 5(c) and 5(d). The subroutine 125 first displays an option screen which requires the customer to select desired options for building product accessories 163. The subroutine 125 then displays the design-your-own format screen 164. The format of this screen can consist of a grid having columns and rows of blocks. An exemplary format screen is shown in FIG. 5(d). The grid 164a consists of three rows of blocks 164b and six columns of blocks 164c. It will be appreciated that different numbers of rows and columns can be used.

Referring to FIG. 5(c), after the design-your-own screen is displayed, the user enters a plurality of building product codes 165, one product code into each block in any combination, onto the format screen. As can be seen in FIG. 5(d), nine blocks are each filled with a product code. Row one contains three blocks each having product code "A31". This code represents an Andersen ® awning window having a three foot width and a two foot height. Row two contains three blocks each having product code "AW31", which is an Andersen ® awning window having a three foot width and a 2 feet, 4 inch height. Finally, row three contains three blocks each having product code "A31" again.

After this, the computer calculates a "basic" price and a rough opening dimension for the design-your-own design entered in step 165a. This is done by accessing the master file 130b which contains records listing the building product codes along with the description, style, dimensions and price thereof. The computer determines the rough opening dimension by adding up the dimensions (height and width) of each building product inputted into the design-your-own format screen. The basic price is determined by adding the prices of the individual building products inputted into the design-your-own format screen.

Once the rough opening and basic price for the design-your-own building product is calculated, the computer provides the necessary building components, such as mull posts, stops and trim strips, for example, that are used to create the design-your-own building product desired. This is provided by accessing the combined component and specifics cation file 167. This file also contains labor costs for putting the building products together with the building components. Thus, this file also provides a "final cost" for the design-your-own building product that is desired.

The design-your-own building product created is placed into the rough opening file 152a under the appropriate rough opening dimension heading at step 168. In this way, the rough opening file is constantly updated with new designs. The unique rough opening dimension 164ro and the price 164p are then displayed at 169 and the computer asks whether there are more items to quote. If there are more items, line 169b returns the customer to the format display screen 164. If no more items are desired to be quoted, subroutine 125 is instructed to print the unique design 169p and the design-your-own building product is stored in the quotation file.

Referring to FIGS. 6(a), 6(b), 6(c), 6(c)(1) and 6(d), the order entry routine 24 flow chart will be discussed. As with the price quotations routine 23, the first step is to display an option screen 170a which requires selection of the customer, pricing method and delivery. If the customer has an account number, the customer file discussed in connection with FIG. 3 can supply customer specific price discounting information at the enter selected options step 170b. The customer also enters one of the three options for delivery discussed with respect to FIG. 6(d). If there is no customer file, the dealer can enter his own customer specific information.

A method of entering the order 170 is then selected. There are four separate subroutines related to the four options; recalling quotation subroutine 171; code entry subroutine 172; rough opening subroutine 173; or design-your-own subroutine 174. The recalling quotation subroutine 171 will be discussed with reference to FIG. 6(a); the code entry subroutine 172 will be discussed with reference to FIG. 6(b); the rough opening subroutine 173 will be discussed with reference to FIG. 6(c); and the design-your-own subroutine 174 will be discussed with reference to FIG. 6(c)(1).

The recalling quotation subroutine 171 first begins by asking for a selection of one of two methods of recalling 180. The first method is to enter the document number of the quotation 181. The document number is part of the quotation record stored in the quotation file 143a discussed above. After this, the quotation is displayed 182, along with selections which enable the dealer's customer to choose where the order will be filled. The dealer's customer can choose either (a) to order everything on that particular quotation from a distributor of the dealer, (b) to have that particular order added to a direct order that is being accumulated to be ordered from the distributor's supplier, or (c) to have orders placed against the dealer's on-hand inventory first and material which is unavailable ordered from the distributor or added to a direct order that is being accumulated to be ordered from the distributor's supplier or a combination of these three methods. These options will be discussed further below.

The other recalling quotation 180 option is to enter the customer's account number 183, in which case all of the quotations for that customer can be displayed 184 sequentially from the quotations file 143a, the proper quotation then being selected 185.

After one of the recalling quotation 180 options have been completed, the computer will ask if there are any changes to the quotation 186. If there are no changes, line 189 leads to block 230 in FIG. 6(d) (discussed below). If there are changes, the subroutine 171 leads to a process changes 188 block by which the changes are entered. After this, the subroutine goes to line 189 by line 190 and then to block 230 in FIG. 6(d).

The code entry subroutine 172 flow chart in FIG. 6(b) is similar to the code entry subroutine 127 shown in FIG. 5(a). This code entry subroutine 172 consists first of asking the customer to enter into the computer the customer's desired manufacturer's product code 202. The entered product code is first checked to see if it is a valid entry at step 202a. This is done by accessing the master file 130b. If the product codes is invalid, line 202b leads back to the enter item product code step 202. If the product code is valid, line 202c leads to the display item description step 203 which displays on the computer screen the selected building product. The item is displayed for sight verification by the customer. If the item is a valid product code, but not what the customer desired, line 205 will lead the customer to the enter product code step 202. If the item is correct the computer determines whether this is a built-up item or not by line 206 leading to a decision point 207. If the item is a built-up item, line 208 leads to a display unit options 209 step which shows all of the options, e.g., different accessories, for the basic building product. The customer's desired options are selected and these are entered 210. The entry is then accepted by the computer 211. If the building product desired is not a built-up unit, line 212 leads directly to acceptance by the computer of the entry 211. The subroutine then goes to block 230 of FIG. 6(d).

The rough opening entry subroutine 173 illustrated in FIG. 6(c) will now be discussed. This subroutine 173 first starts by the computer asking the customer to enter a rough opening dimension 222.

The rough opening is then entered 222, as was discussed above with respect to FIG. 5(b). The different types of building products are matched with the rough opening entry inputted by the dealer by accessing the rough opening file 152a and are displayed 223. The design is selected 224 and the subroutine takes the program to block 230 of FIG. 6(d).

The design-your-own subroutine 174 is shown in FIG. 6(c)(1). This subroutine is similar to the design-your-own quotation subroutine 125 shown in FIG. 5. Subroutine 174 consists first of the computer displaying the design-your-own format screen 228c which was shown in FIG. 5(d). The product code information is entered onto the format screen at 228d just as what was described with respect to FIG. 5(c). The computer calculates rough opening dimension and basic price 228e, using the master file 130b, as was explained above. The computer provides the necessary building components at step 228f, such as mulls, by accessing the combined component and specification file 167. The unique design created is then included 228g in the rough opening file 152a. The computer displays rough opening and the price at 228h. The subroutine 174 then takes the program to block 230 of FIG. 6(d).

Referring now to FIG. 6(d), the accepted entry from the order entry 172, rough opening entry 173 or design-your-own 174 subroutines received at block 230 is now matched against one of the three options of delivery selected at step 170b above (FIG. 6(a)). If all items are shipped from the dealer's distributor inventory, this sub-subroutine 231 is activated. The items are first committed from distributor's inventory 232. If the distributor's branch which services the dealer 234 does not have the material, line 234b leads to an automatic transfer of material step 236 from another branch having the material to send it to the servicing branch. Lines 237 and 238 then lead to the display entered order step 260.

Sub-subroutine 231 then displays a prompt asking if there are any corrections needed at 261. If so, line 262 leads to a make corrections entry step 263. After this, the proper order documents are generated at 264. If not, line 265 leads the sub-subroutine 231 to generate the proper order documents 264. The proper order documents 264 will be discussed below. After this, the sub-routine returns to the order selection subroutine 170.

If all items are to be added to a direct shipment 240, these items are accumulated in a direct shipment accumulation file 241. This will allow a bulk number of building products to be shipped at one time from a supplier's inventory to the dealer. The bulk order, when placed, is given a direct order number. This direct order number is used by the dealer when the building products are received from the supplier to adjust the dealer's inventory (see FIG. 4). After this, the sub-subroutine 240 is lead by line 242 to the display entered order 260 step.

If there is a split of items to be ordered from the dealers and the distributor and/or the distributor's supplier, sub-subroutine 245 is activated. First, the dealer's inventory is checked 246. If the dealer has the items, line 247 leads to an update dealer inventory step 247a, if applicable. After this line 247b leads to the generate proper order documents 264 step. If not, line 248 leads to a prompt 249 asking whether the out of stock or non-inventoried dealer items are to be added to the direct shipment. If not, the sub-subroutine 245 returns the dealer to sub-subroutine 231 by line 250. If items are to be added, the sub-subroutine 245 returns the dealer to subsubroutine 240 by line 251.

The proper order documents 264 depend on the method of delivery selected at step 170b above. There are three basic order documents (i) order from dealer, (ii) order from distributor, and (iii) order from supplier. Combinations of any two or all three of these basic order documents can be made depending on the method of delivery selected. In addition, if the dealer selects the costed purchase option, a dealer cost for the ordered building products will be printed.

The direct shipments routine 25 is illustrated in FIG. 7(a), 7(b), and 7(c). There are two ways that a dealer can accumulate items for direct shipment from the distributor 300. First, the file of the order entry system shown in routine 24 (FIG. 6) can be used. Second, a purchasing agent of the dealer can enter items into the system 302.

The purchasing agent subroutine 302 consists first of displaying direct orders 303, both those ordered from the supplier and those in-process. Line 303a then leads to a decision point 304. If no new order is entered, line 305 leads to block 350 of FIG. 7(b). If a new order is entered, line 306 leads to displaying the product options 308 for entry. After this, the options are selected and entered 309. The item code is then entered 310, and the options and item code are displayed 311. If this is the incorrect item code and/or option, line 313 from decision point 312 leads back to block 309 and the process is repeated. If it is the correct item code, line 314 leads the system to block 315 which determines whether the total entered quantities of items satisfies the minimum required for a direct shipment. If not, line 316 leads the system back to the select and enter options block for reentry of more products.

If the system at 315 determines that a minimum order has been achieved, line 317 leads to block 318 of FIG. 7(b). There, the decision is made by the dealer to place the order with the supplier or to leave the order in-process 321. If an order is placed, it is assigned an order number 322. After this, an acknowledgement is printed 323, the order is transmitted to the distributor's computer for subsequent delivery to the distributor's supplier 324, and the direct order file 325 is updated.

The direct order maintenance subroutine 350 flow chart is illustrated in FIG. 7(c). Regardless of which of the two methods was used to enter orders into the direct order system (purchasing agent or dealer order entry) the purchasing agent can maintain orders (both those placed with the supplier and those in-process) by adding items, deleting items, changing quantities, or combining dealer entered orders with other direct orders.

In this subroutine 350, dealer maintenance options 351 are displayed. The agent then selects 352 from the direct order file 325 the type of maintenance to be accomplished and updates the order accordingly 353 for storage in the updated direct order file 354. If the order has already been placed with the supplier 355, line 356 leads the system to print the updated acknowledgement 357 and transmit the changes to the distributor for delivery to the distributor's supplier 358. If the order has not been placed, the system returns to block 318.

The customer system option routine 26 illustrated in FIG. 8 allows the system to be customized to a certain dealer. This routine 26 first consists of the dealer completing a customer control form 380 and 381 and forwarding the form to the distributor's personnel for entry 382 into the system. This record is then stored in a customer control file 383. This customer control file contains, but is not limited to, document header information, inventory control options, direct shipment discount information, password control for files, and system usage information.

The comment file routine 27 flow chart is illustrated in FIG. 9. This routine allows the printing of any disclaimers, slogans, or advertising data at the end of each order or quotation. The subroutine 27 consists of first displaying the options 390 to provide information concerning the document to be commented upon (quotation, order) and then selecting the document 391. The comment is selected from a comment file 198 and is displayed 393. The subroutine 27 then allows entering of comments 394 which in turn updates the comment file 395.

The purchase order routine 28 flow chart is illustrated in FIG. 10. This routine allows costed purchase orders accumulated at step 265 from orders placed with the distributor to be printed on demand. This routine 28 consists of a display menu step 396 which displays the purchase order options on the main menu. The routine 28 then allows selection of the costed purchase order option 397 which draws the information from the purchase order file 399. The costed purchase order is then printed out 398.

While we have illustrated and described a present preferred embodiment of our invention, it is to be understood that we do not limit ourselves thereto and that our invention may be otherwise variously practiced within the scope of the following claims.

We claim:

1. A method of order entry product selection and inventory control for building products, building product accessories and building product components sold by a dealer to a customer comprising the steps of:
   (a) providing a computer having a display screen and a plurality of files;
   (b) creating in said computer a first file listing descriptions, dimensions and styles of available building products by product code along with building product accessories;
   (c) creating in said computer a second file listing rough opening dimensions and building products fitting said rough opening dimensions
   (d) creating in said computer a third file listing building product components;
   (e) entering into said computer a product code, a rough opening dimension or plural product codes for a desired building product;
   (f) if a product code is entered
      (i) said computer selecting from said first file the building product and building product accessories, if any, which match said product code;
      (ii) said computer displaying said selected building product on said computer display screen;
      (iii) if applicable, said computer displaying any or all options for building product accessories associated with said selected building product on said computer display screen; and
      (iv) said customer selecting the desired building product accessories.
   (g) if a rough opening dimension is entered
      (i) said computer comparing said entered rough opening dimension to said rough opening dimensions listed in said second file;
      (ii) said computer displaying an appropriate rough opening dimensions listed in said second file along with the building products fitting said rough opening dimensions; and
      (iii) said customer selecting at least one of said displayed building products;
   (h) if more than one said product code is entered
      (i) said computer combining a plurality of selected building products represented by said product codes to create the customer desired building product design;
      (ii) said computer selecting from said first file the building product and building product accessories, if any, which match each of said entered product codes;
      (iii) said computer determining a rough opening dimension for said customer desired building product design by adding together the dimensions of the products associated with said entered product codes;
      (iv) said computer providing all options for building components from said third file for said customer desired building product design;
      (v) said computer displaying on said computer display screen said customer desired building product design along with said building components and building product accessories, if any; and
      (vi) said computer storing said customer desired building product design and desired building components in said second file;
   (i) said computer determining a price for each of said selected building products;
   (j) said computer displaying said price on said computer display screen; and
   (k) said customer ordering at least one of said selected building products from an inventory of building products.

2. The method of claim 1, including
printing a hard copy of said displayed selected building product.

3. The method of claim 1, including
determining said price for said selected building product by said dealer inputting specific pricing information of said customer into said computer, and said computer matching said pricing information with said selected building product.

4. The method of claim 1, including
said dealer determining said price for said selected building product, and said dealer inputting said price into said computer for display in said computer screen.

5. The method of claim 1, including
ordering said selected building product from at least one of a dealer's inventory, a distributor's inventory or a supplier's inventory.

6. The method of claim 5, including
ordering at least two of said selected building products from at least two of the dealer's inventory, the distributor's inventory or the supplier's inventory.

7. The method of claim 6, including
ordering at least three selected building products from the dealer's inventory, the distributor's inventory and the supplier's inventory.

8. The method of claim 5, including
said computer accumulating orders from said dealer to be ordered from said supplier's inventory, whereby a bulk number of building products may be shipped at one time from said supplier's inventory.

9. The inventory of claim 8, including
after receiving said building products from said supplier, said dealer inputting into said computer information concerning said received building products and
said computer adjusting said dealer's inventory based on said information.

10. The method of claim 5, including
after ordering from said dealer's inventory, said computer adjusting said dealer's inventory.

* * * * *

UNITED STATES PATENT AND TRADEMARK OFFICE
CERTIFICATE OF CORRECTION

PATENT NO. : 4,972,318

DATED : November 20, 1990

INVENTOR(S) : Gordon T. Brown and Richard H. Scherer

It is certified that error appears in the above-identified patent and that said Letters Patent is hereby corrected as shown below:

Column 1, line 68, "means to" should be --that--.

Column 2, line 1, "enable a customer to" should be --a customer can--; line 5, "means to" should be --that--; line 6, "enable the customer to" should be --the customer can--.

Column 11, line 7, after --entry-- a comma should be inserted; line 19, after "dimensions" a semicolon should be inserted.

Column 12, line 31, "in" should be --on--.

Signed and Sealed this

Seventh Day of April, 1992

Attest:

HARRY F. MANBECK, JR.

*Attesting Officer*  *Commissioner of Patents and Trademarks*